(12) United States Patent
Nakao et al.

(10) Patent No.: US 11,318,498 B2
(45) Date of Patent: May 3, 2022

(54) UNIT AND TACTILE SENSATION PROVIDING APPARATUS

(71) Applicant: KYOCERA Corporation, Kyoto (JP)

(72) Inventors: Fumiaki Nakao, Kawasaki (JP); Jun Takeda, Yokohama (JP); Shigeto Hattori, Yokohama (JP); Kazushi Koike, Nara (JP); Takeshi Shintani, Ritto (JP); Takeshi Yamori, Osaka (JP); Shun Hirooka, Nagoya (JP)

(73) Assignee: KYOCERA Corporation, Kyoto (JP)

( * ) Notice: Subject to any disclaimer, the term of this patent is extended or adjusted under 35 U.S.C. 154(b) by 484 days.

(21) Appl. No.: 16/232,455

(22) Filed: Dec. 26, 2018

(65) Prior Publication Data

US 2019/0358673 A1 Nov. 28, 2019

(30) Foreign Application Priority Data

May 28, 2018 (JP) .............................. JP2018-101734

(51) Int. Cl.
*B06B 1/06* (2006.01)
*B06B 1/08* (2006.01)
*G08B 6/00* (2006.01)
*G06F 3/01* (2006.01)

(52) U.S. Cl.
CPC .............. *B06B 1/0603* (2013.01); *B06B 1/08* (2013.01); *G08B 6/00* (2013.01); *G06F 3/016* (2013.01)

(58) Field of Classification Search
CPC ......... B06B 1/08; B06B 1/0603; G06F 3/016; G08B 6/00

USPC ....................................................... 340/407.1
See application file for complete search history.

(56) References Cited

U.S. PATENT DOCUMENTS

| | | | |
|---|---|---|---|
| 8,760,248 B2 | 6/2014 | Marie | |
| 2011/0037546 A1 | 2/2011 | Marie | |
| 2016/0313795 A1* | 10/2016 | Muramatsu | ......... H01L 41/0986 |
| 2018/0356926 A1 | 12/2018 | Park et al. | |
| 2019/0025920 A1* | 1/2019 | Takeda | ..................... G06F 3/041 |

FOREIGN PATENT DOCUMENTS

| | | | | |
|---|---|---|---|---|
| EP | 2202619 A1 * | 6/2010 | ............. | G06F 3/016 |
| EP | 2202619 A1 | 6/2010 | | |
| JP | 2012-524506 A | 10/2012 | | |
| JP | 2017-097784 A | 6/2017 | | |
| JP | 2017-175874 A | 9/2017 | | |
| KR | 10-2010-0074005 A | 7/2010 | | |
| KR | 10-2017-0065986 A | 6/2017 | | |
| WO | 2015/092966 A1 | 6/2015 | | |
| WO | 2017090448 A1 | 6/2017 | | |
| WO | WO-2017090448 A1 * | 6/2017 | ............. | G06F 3/016 |
| WO | 2017/173386 A1 | 10/2017 | | |

* cited by examiner

*Primary Examiner* — Quan Zhen Wang
*Assistant Examiner* — Mancil Littlejohn, Jr.
(74) *Attorney, Agent, or Firm* — Studebaker & Brackett PC

(57) ABSTRACT

A unit and a tactile sensation providing apparatus which enable simplification of the assembly process of the apparatus are provided. The unit is provided with an actuator, a first fixing unit fixable to a base, a second fixing unit, and an elastic member configured to couple the first fixing unit and the second fixing unit together. The second fixing unit is fixable to a vibration object and coupled to the actuator.

9 Claims, 9 Drawing Sheets

FIG. 1
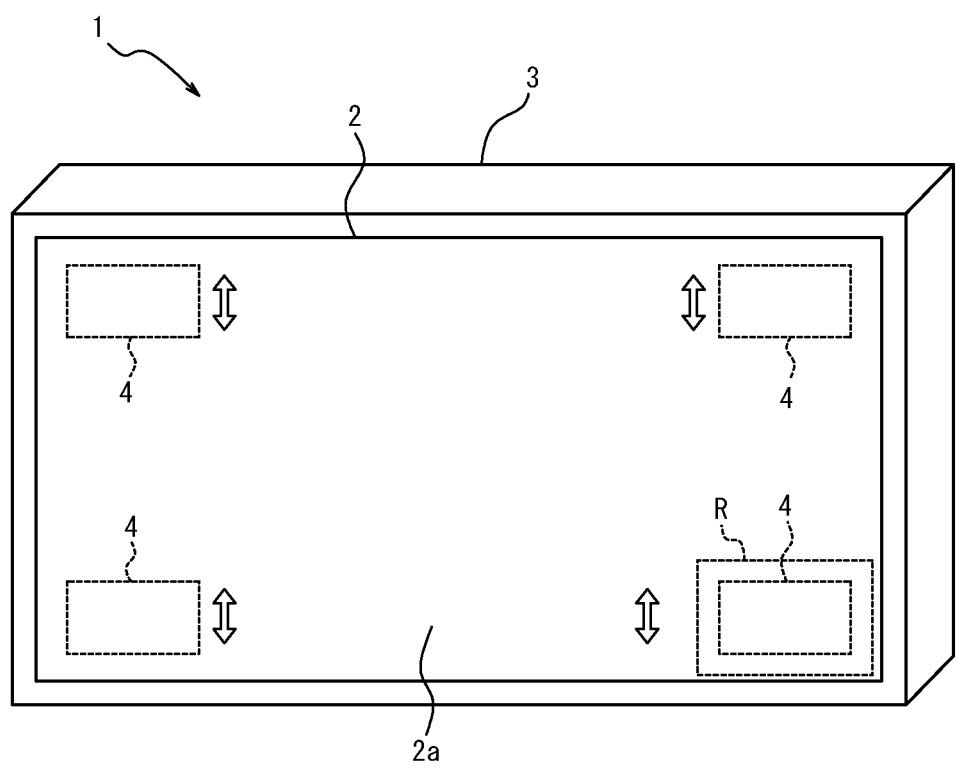
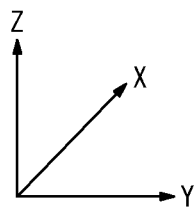

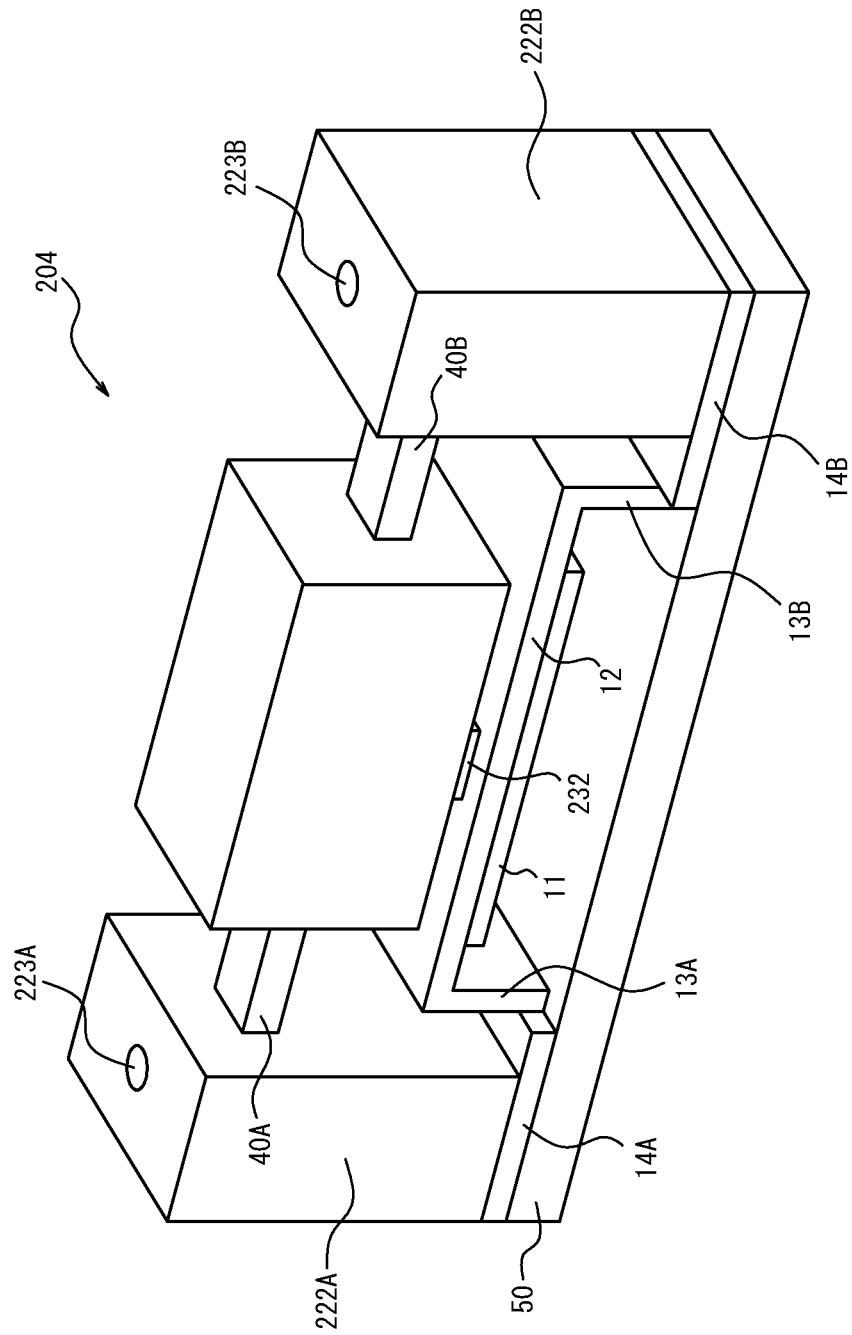

UNIT AND TACTILE SENSATION PROVIDING APPARATUS

CROSS REFERENCE TO RELATED APPLICATIONS

The present application claims priority to and the benefit of Japanese Patent Application No. 2018-101734 filed May 28, 2018, the entire contents of which are incorporated herein by reference.

TECHNICAL FIELD

The present disclosure relates to a unit and a tactile sensation providing apparatus.

BACKGROUND

Conventionally, apparatuses for providing tactile sensations to users are known. The apparatus provides a tactile sensation to a user by means of an actuator which vibrates a touch sensor, or the like.

SUMMARY

According to an embodiment, a unit is provided with an actuator, a first fixing unit fixable to a base, a second fixing unit, and an elastic member that couples the first fixing unit and the second fixing unit together. The second fixing unit is fixable to a vibration object and connected to the actuator.

According to an embodiment, a tactile sensation providing apparatus is provided with a vibration object and a unit. The unit is provided with an actuator, a first fixing unit that is fixable to a base, a second fixing unit, and an elastic member that couples the first fixing unit and the second fixing unit together. The second fixing unit is fixable to the vibration object and connected to the actuator.

BRIEF DESCRIPTION OF THE DRAWINGS

In the accompanying drawings:

FIG. 1 is an external view of a tactile sensation providing apparatus having a unit according to an embodiment of the present disclosure incorporated therein.

FIG. 9 is a perspective view of the unit illustrated in FIG. 8.

DETAILED DESCRIPTION

Figure 2:
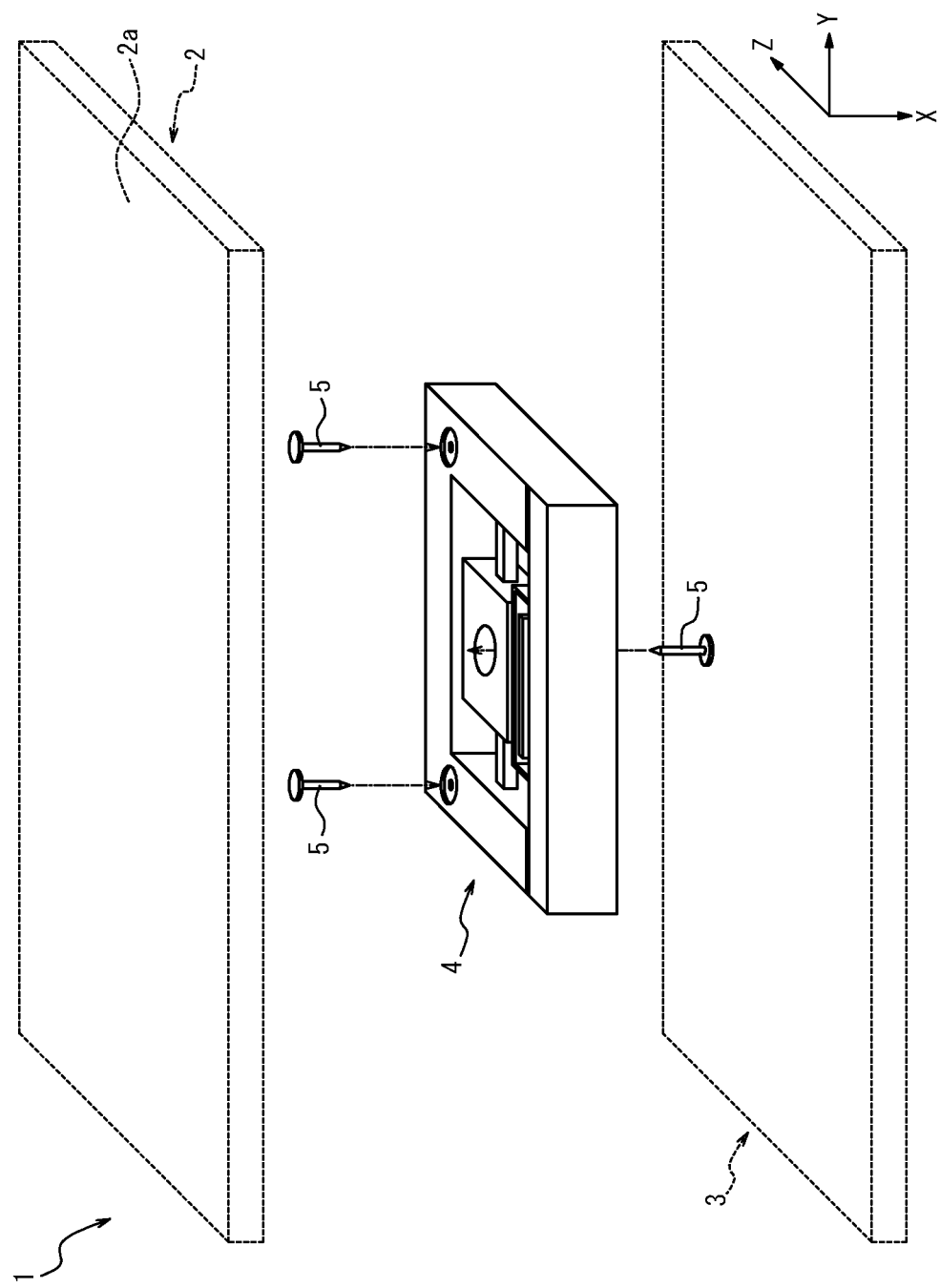
FIG. 2 is an exploded perspective view of a region R illustrated in FIG. 1.

In conventional apparatuses, it is desired to simplify the assembly processes for the purpose of cost reduction, etc. The present disclosure aims to provide a unit and a tactile sensation providing apparatus which enable simplification of the assembly process of the apparatus.

The present disclosure provides a unit and a tactile sensation providing apparatus which enable simplification of the assembly process for the apparatus.

Hereinafter, embodiments of the present disclosure will be described with reference to the accompanying drawings. Hereinafter, the same components are denoted by the same reference numerals throughout the figures. Note that the figures used in the following description are used for illustrative purposes only. The sizes and ratios in the figures are not necessarily drawn to scale.

FIG. 1 is an external view of a tactile sensation providing apparatus 1 which incorporates a plurality of units 4 according to an embodiment of the present disclosure. FIG. 2 is an exploded perspective view of a region R illustrated in FIG. 1. As illustrated in FIG. 1, the tactile sensation providing apparatus 1 is a rectangular parallelepiped shape in appearance. In FIG. 1 and FIG. 2, hereinafter, the thickness direction of the tactile sensation providing apparatus 1 corresponds to an X-axis direction, the longitudinal direction of the tactile sensation providing apparatus 1 corresponds to a Y-axis direction, and the transverse direction of the tactile sensation providing apparatus 1 corresponds to a Z-axis direction.

The tactile sensation providing apparatus 1 is provided with a vibration object 2, a housing 3, and four units 4. The number of the units 4 of the tactile sensation providing apparatus 1 is not limited to four. The number of the units 4 of the tactile sensation providing apparatus 1 may be three or less, or five or more.

The tactile sensation providing apparatus 1 provides a tactile sensation to a user touching a primary surface 2a of the vibration object 2 by vibrating the vibration object 2. The tactile sensation providing apparatus 1 may be, for example, an in-vehicle device such as a car navigation system, a switch on a steering wheel, or a switch for a power window. Alternatively, the tactile sensation providing apparatus 1 may be, for example, a mobile phone, a smartphone, a tablet computer, or a laptop PC. However, the tactile sensation providing apparatus 1 is not limited thereto. The tactile sensation providing apparatus 1 may be a variety of electronic devices, including desktop PCs, household appliances, factory automation (FA) machines, specialized terminals, and so on.

The vibration object 2 includes the primary surface 2a. The user touches the primary surface 2a with a finger or the like. The vibration object 2 may be a touch sensor provided in a display panel. However, the vibration object 2 is not limited to the touch sensor. For example, the vibration object 2 may be a switch. Vibration of the units 4 is delivered to the vibration object 2. The vibration object 2 vibrates when receiving the vibration from the units 4.

Vibration of the vibration object 2 includes vibration in an in-plane direction and vibration in an out-of-plane direction. The in-plane direction corresponds to a direction substantially parallel to the primary surface 2a of the vibration object 2. In FIG. 1, for example, the in-plane direction is parallel to a ZY plane. In FIG. 1, thus, a vibration in the in-plane direction corresponds to, for example, a vibration in the Z-axis direction. Also, the out-of-plane direction is orthogonal to the primary surface 2a of the vibration object 2. In FIG. 1, thus, a vibration in the out-of-plane direction corresponds to a vibration in the X-axis direction. Hereinafter, vibration in the in-plane direction is also referred to as a "transverse vibration", and vibration in the out-of-plane direction is also referred to as a "vertical vibration".

Figure 3:
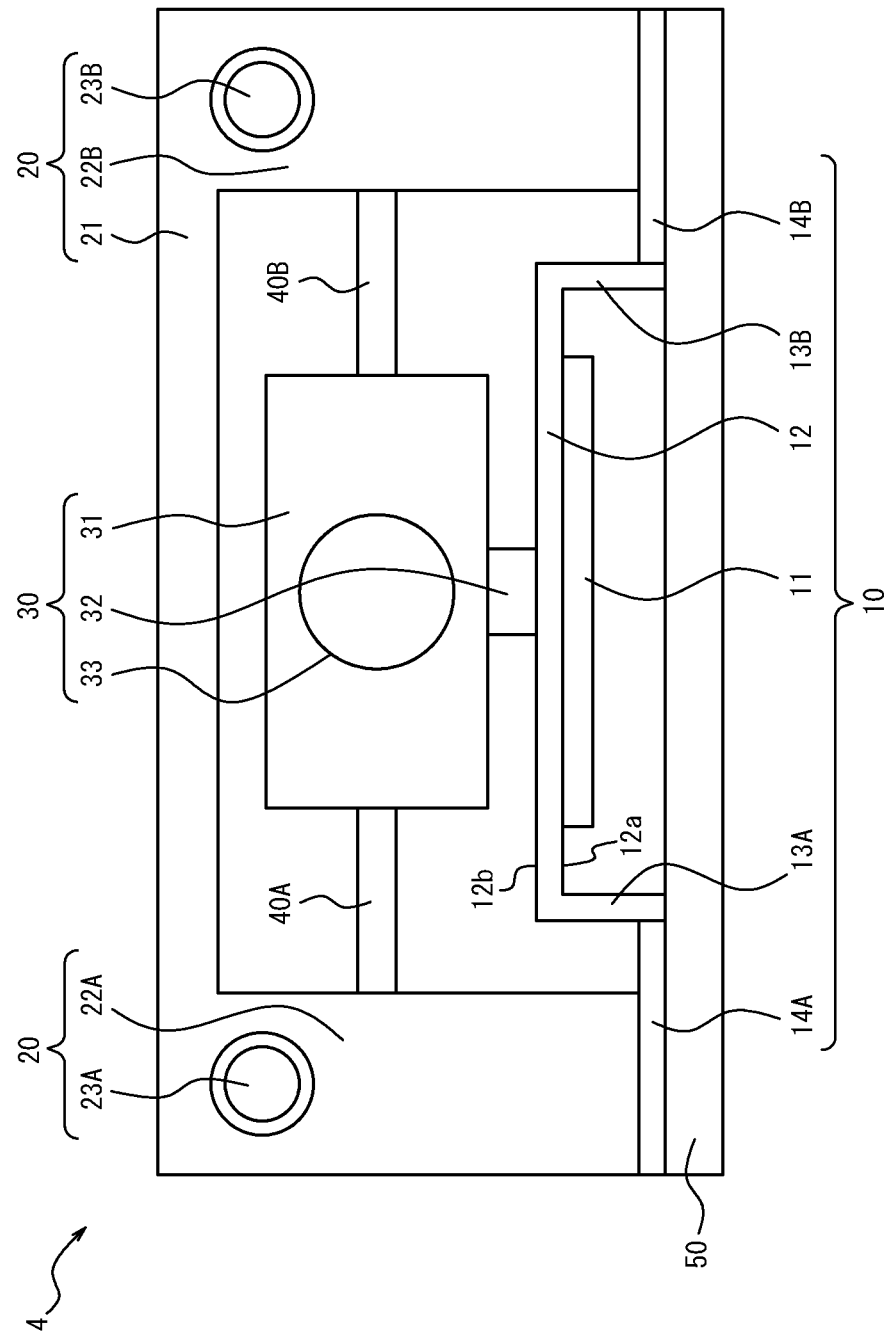
FIG. 3 is an elevation view of the unit according to the embodiment of the present disclosure.
Figure 6:
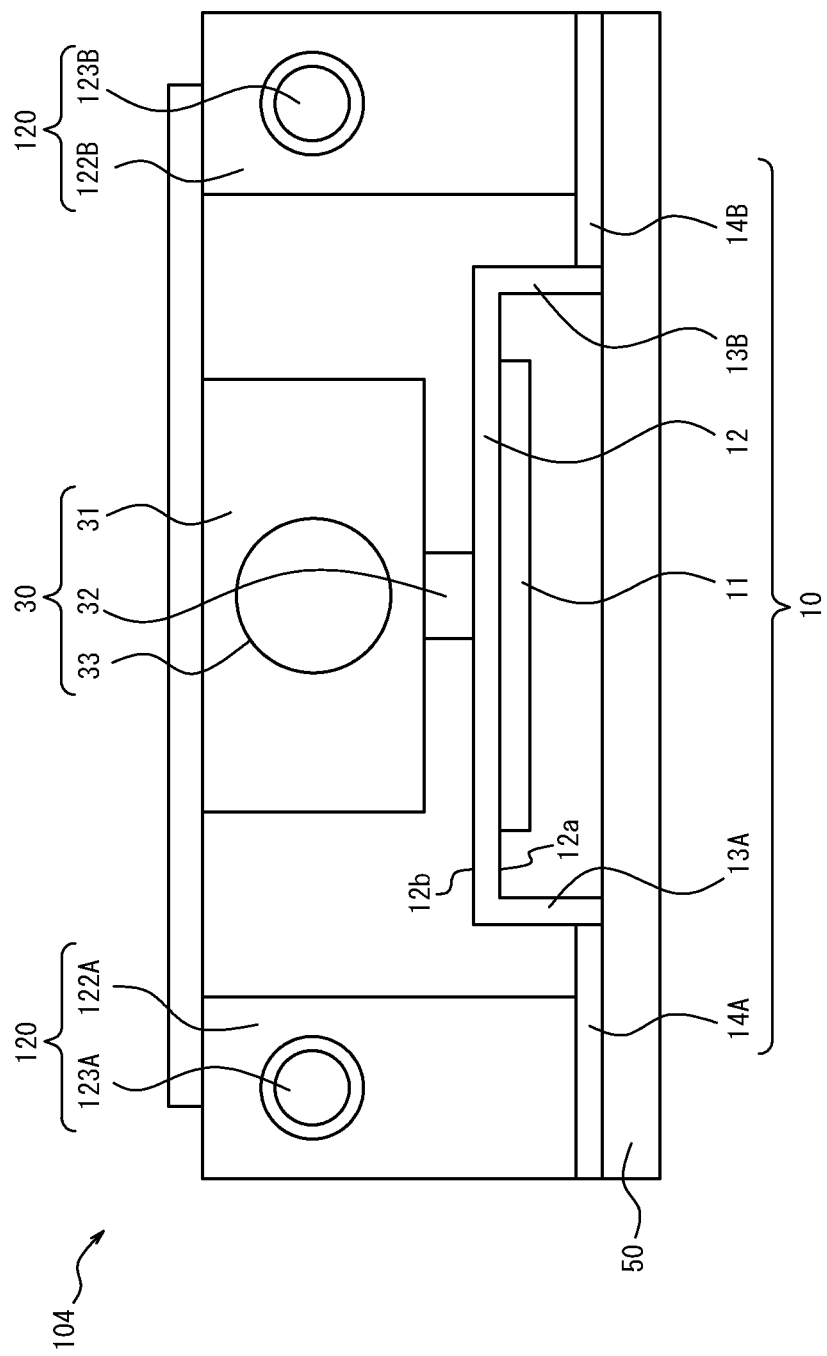
FIG. 6 is an elevation view of a unit according to another embodiment of the present disclosure.
Figure 8:
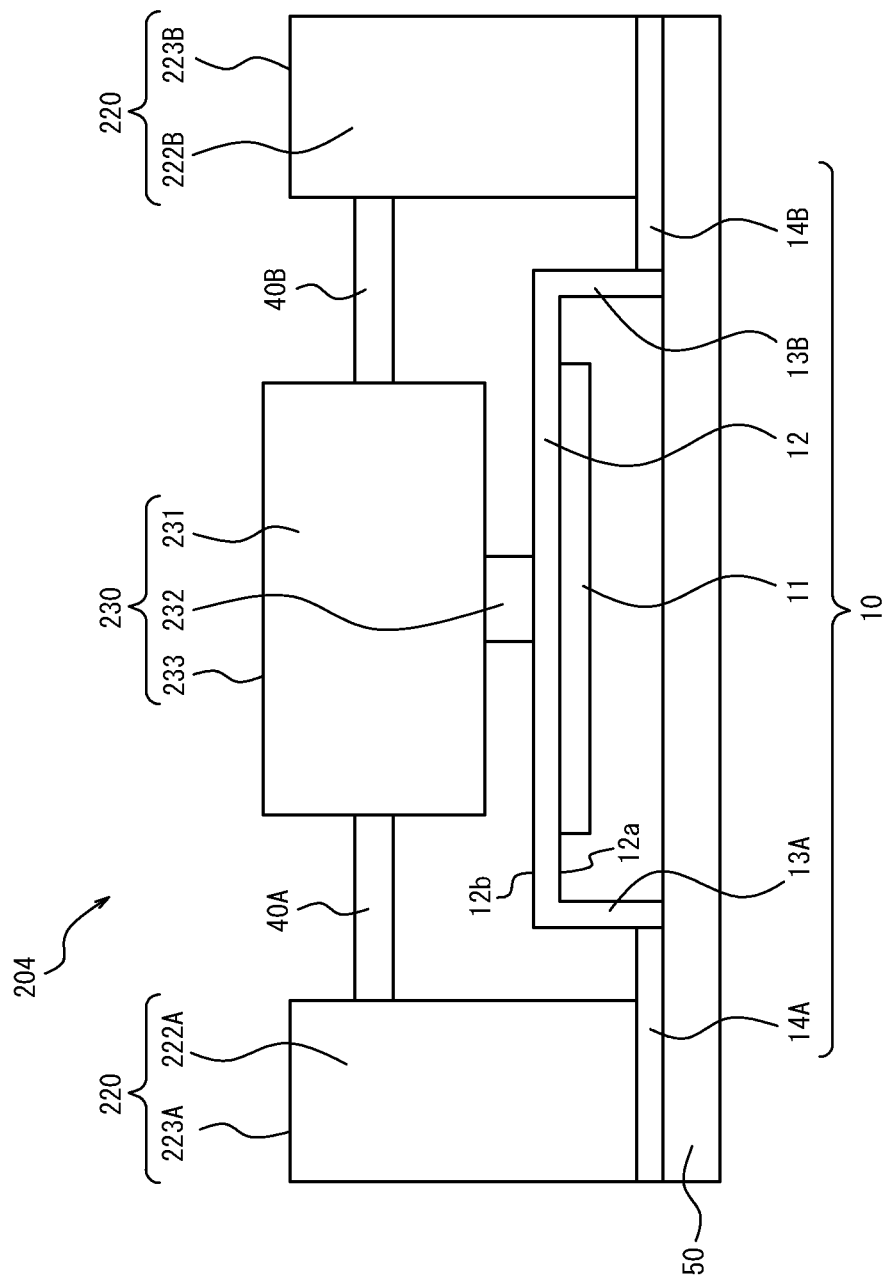
FIG. 8 is an elevation view of a unit according to still another embodiment of the present disclosure.

The vibration direction of the vibration object 2 can be set by appropriately selecting the units 4 incorporated in the tactile sensation providing apparatus 1. For example, in order to set the vibration direction of the vibration object 2 to the in-plane direction, that is, in order to cause transverse vibration of the vibration object 2, a unit 4 as illustrated in FIG. 3 or a unit 104 as illustrated in FIG. 6, which will be described later, may be selected. On the other hand, in order to set the vibration direction of the vibration object 2 to the out-of-plane direction, that is, in order to cause the vertical vibration of the vibration object 2, a unit 204 as illustrated in FIG. 8, which will be described later, may be selected.

The vibration direction of the vibration object 2 may be appropriately set according to a usage of the tactile sensation providing apparatus 1 and so on. For example, when the tactile sensation providing apparatus 1 is an in-vehicle device, the vibration object 2 may constitute a display of a car navigation system. Also, a traveling direction of a vehicle equipped with the tactile sensation providing apparatus 1 may substantially corresponds to the X-axis direction. In this case, the vibration direction of the vibration object 2 may be set to the in-plane direction.

The housing 3 may be made of a metal or a synthetic resin. The housing 3 protects components inside the tactile sensation providing apparatus 1. The housing 3 may accommodate the units 4, a controller, and a memory. The controller may be constituted by a processor or a microcomputer that is capable of executing application software. The controller is coupled to the units 4. The controller outputs a drive signal for vibrating the units 4 to the units 4. The drive signal may be a voltage signal or a current signal. The memory may be constituted by a semiconductor memory or a magnetic memory. The memory stores various information and programs for operating the controller. The controller and the memory may be provided external to the housing 3.

Each unit 4 is incorporated into the tactile sensation providing apparatus 1 as a single component, as illustrated in FIG. 2. Each unit 4 is arranged between the vibration object 2 and a bottom surface of the housing 3. The arrangement positions of the units 4 may be appropriately determined according to the size of the vibration object 2. For example, when the vibration object 2 has a rectangular shape as illustrated in FIG. 1, four units 4 may be provided to the respective corners of the vibration object 2 as illustrated in FIG. 1.

The units 4 vibrate according to the voltage signal output by the controller of the tactile sensation providing apparatus 1. The vibration of the units 4 is delivered to the vibration object 2 of the tactile sensation providing apparatus 1.

Figure 4:
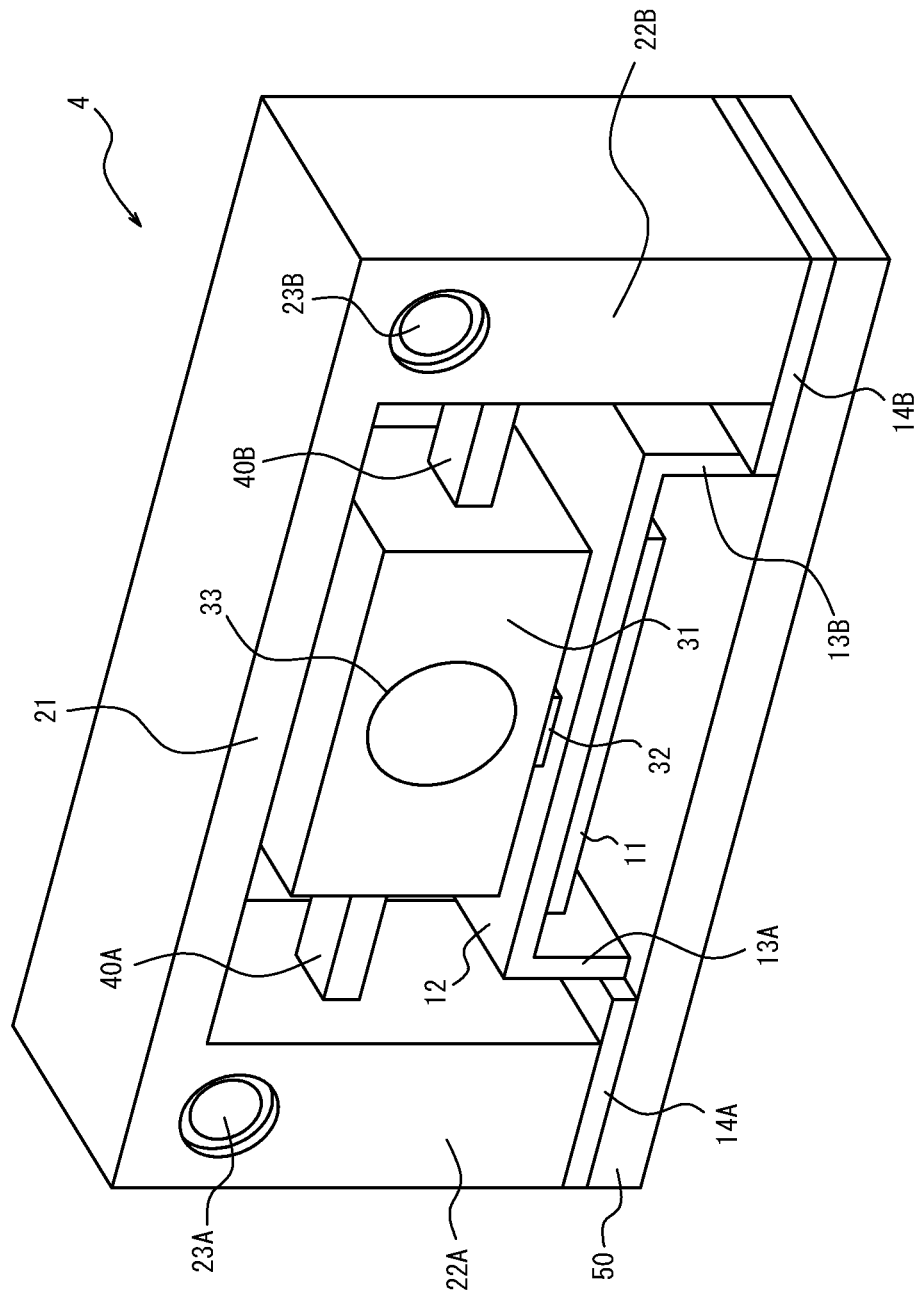
FIG. 4 is a perspective view of the unit illustrated in FIG. 3.

FIG. 3 is an elevation view of a unit 4 according to the embodiment of the present disclosure. FIG. 4 is a perspective view of the unit 4 illustrated in FIG. 3. The unit 4 may be selected in order to set the vibration direction of the vibration object 2 illustrated in FIG. 1 described above to the in-plane direction, that is, in order to cause the transverse vibration of the vibration object 2.

As illustrated in FIG. 3, the unit 4 is provided with an actuator 10, a first fixing unit 20, a second fixing unit 30, and elastic members 40A and 40B. The unit 4 may be further provided with a base 50.

The actuator 10 converts the voltage signal output by the controller of the tactile sensation providing apparatus 1 illustrated in FIG. 1 and described above into a vibration. As illustrated in FIG. 3, the actuator 10 is provided with a piezoelectric element 11, a diaphragm 12, supports 13A and 13B, and bases 14A and 14B. The diaphragm 12, the supports 13A and 13B, and the bases 14A and 14B may be integrally formed by, for example, bending a thin plate. Alternatively, the diaphragm 12, the supports 13A and 13B, and the bases 14A and 14B may be constituted by individual components. When the diaphragm 12, the supports 13A and 13B, and the bases 14A and 14B are constituted by individual components, they may be integrally formed by soldering or the like.

The piezoelectric element 11 is, for example, rectangular in shape. The voltage signal output by the controller of the tactile sensation providing apparatus 1 illustrated in FIG. 1 and described above is applied to the piezoelectric element 11. The piezoelectric element 11 expands and contracts in its longitudinal direction according to the voltage signal. The piezoelectric element 11 may be a piezoelectric film or a piezoelectric ceramic. The piezoelectric ceramic may generate a vibration with greater vibration energy than the piezoelectric film.

The piezoelectric element 11 may be replaced by a magnetostrictive element. The magnetostrictive element expands and contracts according to a magnetic field applied thereto. In cases in which the piezoelectric element 11 is replaced by the magnetostrictive element, the unit 4 may be further provided with a coil or the like for converting a drive signal output by the controller described above into a magnetic field.

The diaphragm 12 is an elastic thin plate such as a shim plate. The diaphragm 12 may be a plate-like member with a predetermined thickness. The diaphragm 12 may be made of a metal, a resin, or a composite of metal and resin. Hereinafter, among the two surfaces of the diaphragm 12, the surface facing the base 50 is referred to as the "primary surface 12a". Also, among the two surfaces of the diaphragm 12, the surface facing the second fixing unit 30 is referred to as the "primary surface 12b".

The piezoelectric element 11 is provided to the primary surface 12a. The piezoelectric element 11 is provided to the primary surface 12a with its longitudinal direction extending along the longitudinal direction of the diaphragm 12. The piezoelectric element 11 may be attached to the primary surface 12a by using an adhesive or the like.

The structure in which the piezoelectric element 11 is provided on the primary surface 12a, that is, the structure in which the piezoelectric element 11 is provided on one surface of the diaphragm 12 is so-called unimorph. According to the unimorph, structure an expansion and contraction displacement of the piezoelectric element 11 causes a bending vibration of the diaphragm 12. As illustrated in FIG. 3, one end of the diaphragm 12 is supported by a support 13A. The other end of the diaphragm 12 is supported by a support 13B. When either end of the diaphragm 12 is supported in this manner, the diaphragm 12 vibrates with maximum amplitude in the normal direction of the primary surface 12a in the vicinity of the center of the diaphragm 12.

The unit 4 is incorporated in the tactile sensation providing apparatus 1 illustrated in FIG. 1 and described above in such a manner that the primary surface 12a is substantially parallel to the XY plane illustrated in FIG. 2 and described above. When the primary surface 12a is substantially parallel to the XY plane illustrated in FIG. 2 and described above, the normal direction of the primary surface 12a may correspond to the Z-axis direction illustrated in FIG. 2 and described above. This configuration enables a vibration of the primary surface 12a in the normal direction to cause the vibration object 2 illustrated in FIG. 1 and described above to vibrate in the Z-axis direction. In other words, according to the expansion and contraction displacement of the piezoelectric element 11, the unit 4 transversely vibrates the vibration object 2 illustrated in FIG. 1 and described above.

As illustrated in FIG. 3, the support 13A is provided at one end of the diaphragm 12 in the longitudinal direction. One end of the support 13A is coupled to the diaphragm 12, and the other end of the support 13A is coupled to the base 14A. As illustrated in FIG. 3, the support 13B is provided at the other end of the diaphragm 12 in the longitudinal direction. One end of the support 13B is coupled to the diaphragm 12, and the other end of the support 13B is coupled to the base 14B.

The supports 13A and 13B support the diaphragm 12 with a space between the piezoelectric element 11 and the base 50. The space between the piezoelectric element 11 and the base 50 may prevent the piezoelectric element 11 from colliding with the base 50 when the diaphragm 12 vibrates according to the displacement of the piezoelectric element 11. The supports 13A and 13B may be made of a material the same as, or different from, the diaphragm 12.

As illustrated in FIG. 3, the base 14A is fixed to one end of the base 50. As illustrated in FIG. 3, the base 14B is fixed to the other end of the base 50. The bases 14A and 14B may be fixed between the first fixing unit 20 and the base 50 by using, for example, a fastening member such as a screw, or an adhesive. The bases 14A and 14B may be made of a material the same as, or different from, the diaphragm 12.

The first fixing unit 20 may be fixed to the base of the tactile sensation providing apparatus 1 illustrated in FIG. 1 and described above, e.g., the bottom surface of the housing 3 illustrated in FIG. 2. The first fixing unit 20 may be made of a metal, a resin, or a composite of metal and resin. As illustrated in FIG. 3, the first fixing unit 20 includes a body 21 and legs 22A and 22B. The first fixing unit 20 may further include through holes 23A and 23B.

The leg 22A is provided at one end of the body 21, and the leg 22B is provided at the other end of the body 21. When, for example, the first fixing unit 20 does not include the through holes 23A and 23B, the body 21 may be fixed to the bottom surface of the housing 3 illustrated in FIG. 2 and described above by using an adhesive or the like.

The leg 22A is fixed to one end of the base 50. The base 14A of the actuator 10 is interposed between the leg 22A and the base 50. The leg 22B is fixed to the other end of the base 50. The base 14B of the actuator 10 is interposed between the leg 22B and the base 50.

The legs 22A and 22B may be fixed to the base 50 by using, for example, a fastening member such as a screw, or an adhesive. When, for example, the first fixing unit 20 does not include the through holes 23A and 23B, the legs 22A and 22B may be fixed to the bottom surface of the housing 3 illustrated in FIG. 2 and described above by using an adhesive or the like.

The through hole 23A is provided to the leg 22A, and the through hole 23B is provided to the leg 22B. As illustrated in FIG. 2 and described above, fastening members 5 such as screws are inserted into the through holes 23A and 23B. When the fastening members 5 are inserted into the through holes 23A and 23B, the first fixing unit 20 is fixed to the bottom surface of the housing 3.

The second fixing unit 30 may be fixed to the vibration object 2 illustrated in FIG. 2 and described above. The second fixing unit 30 may be made of a metal, a resin, or a composite of metal and resin. As illustrated in FIG. 3, the second fixing unit 30 includes a body 31 and an attaching portion 32. The second fixing unit 30 may further include a through hole 33.

In a state in which the unit 4 is incorporated in the tactile sensation providing apparatus 1 illustrated in FIG. 1 and described above, the body 31 is in contact with the vibration object 2 illustrated in FIG. 2 and described above. In this state, the vibration object 2 does not need to be in contact with the first fixing unit 20. The body 31 delivers the vibration of the diaphragm 12 to the vibration object 2 illustrated in FIG. 2 and described above. When, for example, the second fixing unit 30 does not include the through hole 33, the body 31 may be fixed to the vibration object 2 illustrated in FIG. 2 and described above by using an adhesive or the like.

The attaching portion 32 is attached in the vicinity of the center of the primary surface 12b of the diaphragm 12. When the attaching portion 32 is attached to the primary surface 12b, the vibration of the diaphragm 12 is delivered to the body 31 and thus to the vibration object 2 illustrated in FIG. 2 and described above.

As illustrated in FIG. 2 and described above, the fastening member 5 such as a screw is inserted into the through hole 33. When the fastening member 5 is inserted into the through hole 33, the second fixing unit 30 is fixed to the vibration object 2.

The elastic members 40A and 40B couple the first fixing unit 20 and the second fixing unit 30 together. For example, the elastic member 40A couples the leg 22A of the first fixing unit 20 and the body 31 of the second fixing unit 30, and the elastic member 40B couples the leg 22B of the first fixing unit 20 and the body 31 of the second fixing unit 30. The elastic members 40A and 40B may be leaf springs.

The base 14A of the actuator 10 and the leg 22A of the first fixing unit 20 are fixed to one end of the base 50. The base 14B of the actuator 10 and the leg 22B of the first fixing unit 20 are fixed to the other end of the base 50. The base 50 may be made of a metal, a resin, or a composite of metal and resin.

Figure 5:
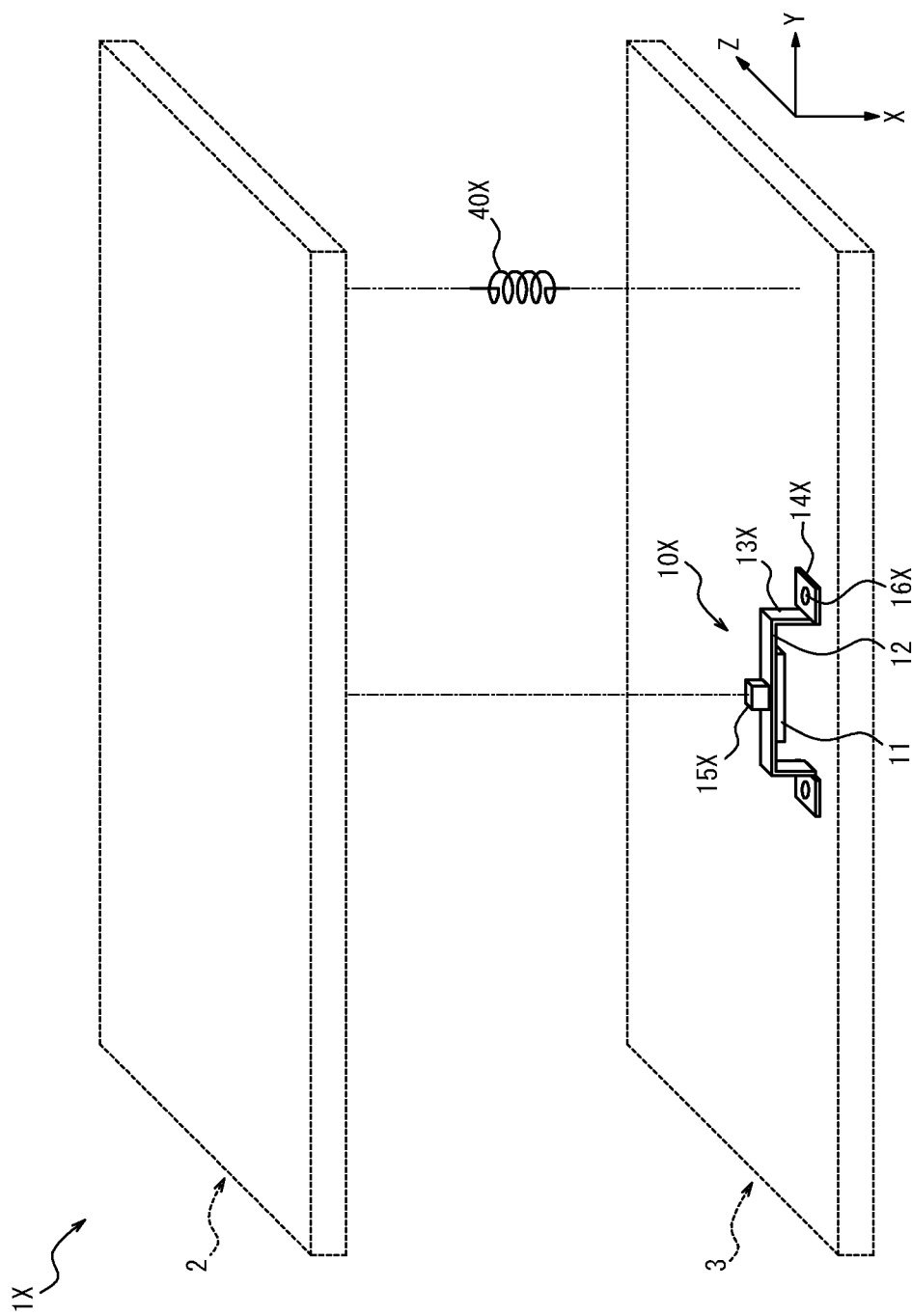
FIG. 5 is an exploded perspective view of a tactile sensation providing apparatus according to a comparative example.

FIG. 5 is an exploded perspective view of a tactile sensation providing apparatus 1X according to a comparative example. FIG. 5 corresponds to FIG. 2 described above. According to the comparative example, an actuator 10X and an elastic member 40X are directly incorporated into the tactile sensation providing apparatus 1X, in place of the unit 4 described above.

The actuator 10X is provided with the piezoelectric element 11, the diaphragm 12, a support 13X, a base 14X, and a support 15X.

One end of the support 13X is coupled to the diaphragm 12. The other end of the support 13X is coupled to the base 14X.

The base 14X is fixed to the housing 3. The base 14X may include a hole 16X. The base 14X may be fixed to the housing 3 by a fastening member such as a screw inserted into the hole 16X. The base 14X may be fixed to the housing 3 by using an adhesive or the like.

The support 15X is provided on one of the two surfaces of the diaphragm 12 that faces the vibration object 2. The support 15X is attached to the vibration object 2 by using an adhesive or the like. When the support 15X is attached to the vibration object 2, the vibration of the diaphragm 12 is delivered to the vibration object 2.

The elastic member 40X is a coil spring. At least four elastic members 40X are provided to the respective corners of the tactile sensation providing apparatus 1X. The elastic member 40X is coupled between the vibration object 2 and the housing 3. For example, one end of the elastic member 40X is coupled to the vibration object 2, and the other end of the elastic member 40X is coupled to the bottom surface of the housing 3. When at least four elastic members 40X are coupled between the vibration object 2 and the housing 3 at the respective corners of the tactile sensation providing apparatus 1X, the vibration object 2 may be displaced with respect to the housing 3. That is, the vibration object 2 may be vibrated by the vibration delivered from the diaphragm 12 via the support 15X.

As described above, the tactile sensation providing apparatus 1X according to the comparative example is provided with a plurality of elastic members 40X and the actuator 10X, in order to provide a tactile sensation to the user. That is, the tactile sensation providing apparatus 1X according to the comparative example uses a plurality of components for providing the tactile sensation to the user. However, the increase in the number of components used in the tactile sensation providing apparatus 1X increases the number of assembly steps involved in the manufacturing process for the tactile sensation providing apparatus 1X.

On the other hand, the tactile sensation providing apparatus 1 according to the present embodiment can provide a tactile sensation to the user by incorporating the unit 4 as one component at an appropriate position, without using a plurality of elastic members 40X. That is, the present embodiment may reduce the number of components incorporated into the tactile sensation providing apparatus 1. Thus, according to the present embodiment, the manufacturing process for the tactile sensation providing apparatus 1 may involve a reduced number assembly steps.

Further, the comparative example employs coil springs as the elastic members 40X, to enable the displacement of the vibration object 2 with respect to the housing 3. The coil springs may be deformed in their up, down, left, and right directions. In the comparative example, because the coil springs may be deformed in their up, down, left, and right directions, a process to connect the elastic members 40X between the vibration object 2 and the housing 3 may become complicated during the manufacturing process of the tactile sensation providing apparatus 1X. Further, after the tactile sensation providing apparatus 1X is manufactured, the coil springs serving as the elastic members 40X may be deformed in an unintended direction, causing a vibration of the vibration object 2 in an unintended direction.

According to the present embodiment, on the other hand, during the manufacturing of the tactile sensation providing apparatus 1, the unit 4 provided with the elastic members 40A and 40B is incorporated into the tactile sensation providing apparatus 1, instead of directly incorporating the elastic members 40X into the tactile sensation providing apparatus 1. This avoids complication of the assembly process for manufacturing of the tactile sensation providing apparatus 1. Also, the unit 4 may be provided with the elastic members 40A and 40B formed by leaf springs. The deformation directions of the leaf spring are limited more than those of, for example, a coil spring. Accordingly, the tactile sensation providing apparatus 1 according to the present embodiment may prevent the vibration object 2 from vibrating in an unintended direction.

According to the comparative example, the positional relationship between the elastic member 40X and the actuator 10X is appropriately adjusted on the basis of the size of the vibration object 2. Thus, when the size of the vibration object 2 is changed due to a change of a specification of the tactile sensation providing apparatus 1X or the like, the positional relationship between the elastic member 40X and the actuator 10X needs readjustment.

According to the present embodiment, on the other hand, the relationship between the elastic members 40A and 40B and the actuator 10 may be appropriately adjusted by adjusting the unit 4. Therefore, when the size of the vibration object 2 is changed, the positional relationship between the elastic members 40A and 40B and the actuator 10 does not need readjustment. According to the present embodiment, when the size of the vibration object 2 is changed, the number of the units 4 incorporated into the tactile sensation providing apparatus 1 is simply adjusted. Thus, the unit 4 according to the present embodiment provides a high degree of convenience.

According to the comparative example, when the tactile sensation providing apparatus 1X is an in-vehicle device, the travel direction of the vehicle having the tactile sensation providing apparatus 1X mounted therein may be a substantially X-axis direction. Thus, an abrupt start or stop of the vehicle having the tactile sensation providing apparatus 1X mounted therein causes an acceleration in the X-axis direction. According to the comparative example, here, the actuator 10X is in contact with the housing 3 at two positions via the bases 14X, while being in contact with the vibration object 2 at one position via the support 15X. Thus, when the acceleration acts along the X-axis direction, the force received at the housing 3 at the two positions of the bases 14X is applied to the one position at the support 15X, potentially damaging the vibration object 2. In this case, the actuator 10X may also be damaged.

According to the present embodiment, on the other hand, when the tactile sensation providing apparatus 1 is an in-vehicle device, the first fixing unit 20 is fixed to the housing 3, and the second fixing unit 30 is fixed to the vibration object 2. Here, as illustrated in FIG. 3 and FIG. 4 and described above, the first fixing unit 20 and the second fixing unit 30 have larger areas than the support 15X illustrated in FIG. 5. Unlike the comparative example, accordingly, the probability of damaging the vibration object 2 due to an abrupt start or stop of the vehicle having the tactile sensation providing apparatus 1 mounted therein may be reduced. According to the present embodiment, also, in the tactile sensation providing apparatus 1 the elastic members 40A and 40B may be deformed in the Z-axis direction. Thus, when an acceleration acts in the X-axis direction due to an abrupt start or stop of the vehicle, the force is prevented from being applied to the actuator 10 via the elastic members 40A and 40B. This configuration may reduce the probability of damaging the actuator 10.

According to the comparative example, further, the actuator 10X is incorporated into the tactile sensation providing apparatus 1X in such a manner that the support 13X is orthogonal to the bottom surface of the housing 3. Due to this configuration, the comparative example may increase the thickness of the tactile sensation providing apparatus 1X.

On the other hand, according to the present embodiment as illustrated in FIG. 2 and described above, the unit 4 is incorporated into the tactile sensation providing apparatus 1 in such a manner that the support 13 is parallel to the bottom surface of the housing 3. This configuration of the present embodiment avoids an increase in the thickness of the tactile sensation providing apparatus 1.

Figure 7:
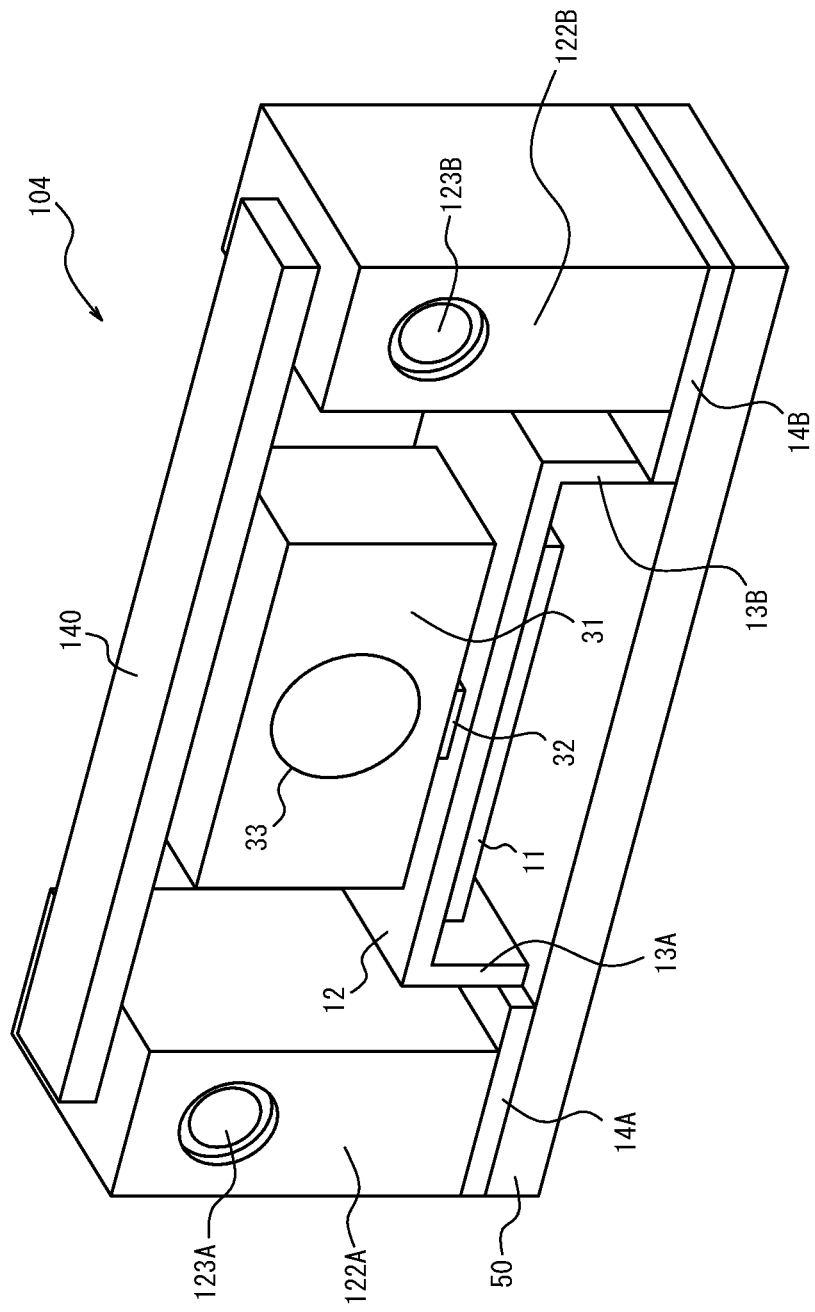
FIG. 7 is a perspective view of the unit illustrated in FIG. 6.

FIG. 6 is an elevation view of a unit 104 according to another embodiment of the present disclosure. FIG. 7 is a perspective view of the unit 104 illustrated in FIG. 6. The unit 104 may be employed in order to set the vibration direction of the vibration object 2 illustrated in FIG. 1 and described above in the in-plane direction, that is, in order to cause transverse vibration of the vibration object 2 illustrated in FIG. 1 and described above.

As illustrated in FIG. 6, the unit 104 is provided with the actuator 10, a first fixing unit 120, the second fixing unit 30, and an elastic member 140.

Similarly to the first fixing unit 20 described above, the first fixing unit 120 may be fixed to the base of the tactile sensation providing apparatus 1 illustrated in FIG. 1 and described above, e.g., to the bottom surface of the housing 3 illustrated in FIG. 2 and described above. The first fixing unit 120 may be made of a material similar to that of the first fixing unit 20 described above. As illustrated in FIG. 6, the first fixing unit 120 includes legs 122A and 122B. The first fixing unit 120 may further include through holes 123A and 123B.

The leg 122A is fixed to one end of the base 50. The base 14A of the actuator 10 is interposed between the leg 122A and the base 50. The leg 122B is fixed to the other end of the base 50. The base 14B of the actuator 10 is interposed between the leg 122B and the base 50.

The legs 122A and 122B may be fixed to the base 50 by using a fastening member such as a screw, or an adhesive. When, for example, the first fixing unit 120 does not include the through holes 123A and 123B, the legs 122A and 122b may be fixed to the bottom surface of the housing 3 illustrated in FIG. 2 and described above by using an adhesive or the like.

The through hole 123A is provided to the leg 122A. The through hole 123B is provided to the leg 122B. As illustrated in FIG. 2 and described above, the fastening members 5 such as screws may be inserted into the through holes 123A and 123B. When the fastening members 5 are inserted into the through holes 123A and 123B, the first fixing unit 123 may be fixed to the bottom surface of the housing 3.

The elastic member 140 may be a leaf spring. The elastic member 140 couples the first fixing unit 120 and the second fixing unit 30 together. For example, one end of the elastic member 140 is coupled to the leg 122A of the first fixing unit 120. The other end of the elastic member 140 is coupled to the leg 122B of the first fixing unit 120. A central portion of the elastic member 140 is coupled to the body 31 of the second fixing unit 30.

As described above, the unit 104 is provided with one elastic member 140, unlike the unit 4 that is provided with two elastic members 40A and 40B illustrated in FIG. 3 and FIG. 4 and described above. The unit 104 configured as described above is able to provide a similar effect to that provided by the unit 4 described above.

FIG. 8 is an elevation view of a unit 204 according to a further embodiment of the present disclosure. FIG. 9 is a perspective view of the unit 204 illustrated in FIG. 8. The unit 204 may be employed in order to set the vibration direction of the vibration object 2 illustrated in FIG. 1 and described above in the out-of-plane direction. In other words, the unit 204 may be employed in order to cause vertical vibration of the vibration object 2 illustrated in FIG. 1 and described above.

As illustrated in FIG. 8, the unit 204 is provided with the actuator 10, a first fixing unit 220, a second fixing unit 230, and the elastic members 40A and 40B.

Similarly to the first fixing unit 20 described above, the first fixing unit 220 may be fixed to the base of the tactile sensation providing apparatus 1 illustrated in FIG. 1 and described above, e.g., to the bottom surface of the housing 3 illustrated in FIG. 2 and described above. The first fixing unit 220 may be made of a material similar to that of the first fixing unit 20 described above. As illustrated in FIG. 8, the first fixing unit 220 includes legs 222A and 222B. The first fixing unit 220 may further include through holes 223A and 223B.

The leg 222A is fixed to one end of the base 50. The base 14A of the actuator 10 is interposed between the leg 222A and the base 50. The leg 222B is fixed to the other end of the base 50. The base 14B of the actuator 10 is interposed between the leg 222B and the base 50. The legs 222A and 222B may be fixed to the base 50 by using a fastening member such as a screw, or an adhesive.

When the unit 204 is incorporated into the tactile sensation providing apparatus 1 illustrated in FIG. 2, the legs 222A and 222B are arranged perpendicular to the bottom surface of the housing 3 illustrated in FIG. 2. Thus, the legs 222A and 222B are arranged perpendicular to the bottom surface of the housing 3 in such a manner that their portions close to the base 50 are positioned close to the housing 3.

As illustrated in FIG. 9, the through hole 223A is formed on a top surface of the leg 222A. The through hole 223A penetrates from the top surface of the leg 222A to the bottom surface of the base 50. As illustrated in FIG. 9, the through hole 223B is formed on a top surface of the leg 222B. The through hole 223B penetrates from the top surface of the leg 222B to the bottom surface of the base 50. When a fastening member such as a screw is inserted into the through holes 223A and 223B, the first fixing unit 220 may be fixed to the bottom surface of the housing 3 illustrated in FIG. 2 and described above via the base 50.

Similarly to the second fixing unit 30 described above, the second fixing unit 230 may be fixed to the vibration object 2 illustrated in FIG. 2 and described above. The second fixing unit 230 may be made of a material similar to that of the second fixing unit 30 described above. As illustrated in FIG. 8, the second fixing unit 230 includes a body 231, an attaching portion 232, and an attaching surface 233.

The body 231 delivers the vibration of the diaphragm 12 to the vibration object 2 illustrated in FIG. 2 and described above via the attaching surface 233 illustrated in FIG. 9.

The attaching portion 232 is attached in the vicinity of the center of the primary surface 12b of the diaphragm 12. The attachment of the attaching portion 232 to the primary surface 12b enables delivery of the vibration of the diaphragm 12 to the body 231 and thus to the vibration object 2 illustrated in FIG. 2 and described above.

As illustrated in FIG. 9, the attaching surface 233 may be the top surface of the body 31. The attaching surface 233 is attached to the vibration object 2 illustrated in FIG. 2 and described above by using, for example, an adhesive or the like. The attachment of the attaching surface 233 to the vibration object 2 enables delivery of the vibration of the diaphragm 12, as a vibration in the X-axis direction illustrated in FIG. 2 described above, to the vibration object 2. In other words, according to the expansion and contraction displacement of the piezoelectric element 11, the unit 204 causes vertical vibration of the vibration object 2 illustrated in FIG. 1 and described above.

The unit 204 configured as described above may have an effect similar to that of the unit 4 described above.

Although the present disclosure has been described based on the figures and the embodiments, it is to be appreciated that various modifications and changes may be implemented based on the present disclosure by those who are ordinarily skilled in the art. Accordingly, such modifications and changes are included in the scope of the present disclosure. Also, each of the above embodiments does not need to be practiced strictly following the description thereof but may be implemented by appropriately combining or partially omitting features.

For example, in the above embodiment the first fixing unit 20 is described as being fixed to the housing 3 functioning as the base of the tactile sensation providing apparatus 1. However, the first fixing unit 20 may be fixed to a base other than the housing 3. For example, when the tactile sensation providing apparatus 1 is implemented in a vehicle, the second fixing unit 20 may be fixed to a frame of the vehicle.

In the above embodiments for example, the first fixing unit 20 of the unit 4 illustrated in FIG. 3 is fixed to the housing 3 illustrated in FIG. 2, and the second fixing unit 30 of the unit 4 illustrated in FIG. 3 is fixed to the vibration object 2 illustrated in FIG. 2. However, the second fixing unit 30 of the unit 4 illustrated in FIG. 3 may be fixed to the housing 3 illustrated in FIG. 2, and the first fixing unit 20 of the unit 4 illustrated in FIG. 3 may be fixed to the vibration object 2 illustrated in FIG. 2. Similarly, the second fixing unit 30 of the unit 104 illustrated in FIG. 6 may be fixed to the housing 3 illustrated in FIG. 2, and the first fixing unit 120 of the unit 104 illustrated in FIG. 6 may be fixed to the vibration object 2 illustrated in FIG. 2. Similarly, the second fixing unit 230 of the unit 204 illustrated in FIG. 8 may be fixed to the housing 3 illustrated in FIG. 2, and the first fixing unit 220 of the unit 204 illustrated in FIG. 8 may be fixed to the vibration object 2 illustrated in FIG. 2.

The invention claimed is:

1. A unit comprising:
   an actuator having a piezoelectric element and a diaphragm;
   a first fixing unit that is fixable to a base and that has two legs;
   a second fixing unit that is fixable to a vibration object and coupled to the diaphragm, the second fixing unit being positioned between the two legs; and
   two elastic members configured to couple the two legs with one side and an other side of the second fixing unit together, respectively.

2. The unit according to claim 1, wherein the unit vibrates the vibration object according to expansion and contraction displacement of the piezoelectric element.

3. The unit according to claim 2, configured to vibrate a primary surface of the vibration object in an in-plane direction according to the expansion and contraction displacement of the piezoelectric element.

4. The unit according to claim 2, configured to vibrate a primary surface of the vibration object in an out-of-plane direction according to the expansion and contraction displacement of the piezoelectric element.

5. The unit according to claim 1,
   wherein the elastic members are configured to directly couple the first fixing unit and the second fixing unit together.

6. The unit according to claim 1,
   wherein the second fixing unit is between the actuator and the elastic members.

7. A tactile sensation providing apparatus comprising:
   a vibration object and a unit,
   wherein the unit is provided with:
      an actuator having a piezoelectric element and a diaphragm;
      a first fixing unit that is fixable to a base and that has two legs;
      a second fixing unit that is fixable to the vibration object and coupled to the diaphragm, the second fixing unit being positioned between the two legs; and
   two elastic members configured to couple the two legs with one side and an other side of the second fixing unit together, respectively.

8. The tactile sensation providing apparatus according to claim 7,
   wherein the elastic members are configured to directly couple the first fixing unit and the second fixing unit together.

9. The tactile sensation providing apparatus according to claim 7,
   wherein the second fixing unit is between the actuator and the elastic members.

* * * * *